United States Patent [19]
DeLong

[11] 3,869,485
[45] Mar. 4, 1975

[54] PREPARATION OF ACID CHLORIDES WITH PHOSGENE IN THE PRESENCE OF A CATALYST

[75] Inventor: Richard C. DeLong, Snyder, N.Y.

[73] Assignee: Allied Chemical Corporation, New York, N.Y.

[22] Filed: Sept. 25, 1969

[21] Appl. No.: 861,161

[52] U.S. Cl. ................................ 260/408, 260/544
[51] Int. Cl. ............................................. C11c 3/00
[58] Field of Search ........................... 260/544, 408

[56] References Cited
UNITED STATES PATENTS
3,547,960  12/1970  Hauser................................ 260/408

*Primary Examiner*—Elbert L. Roberts
*Assistant Examiner*—Catherine L. Mills
*Attorney, Agent, or Firm*—Anthony J. Stewart; Jay P. Friedenson

[57] ABSTRACT

An improved process for the preparation of monocarboxylic acid halides by reaction of monocarboxylic acids, or anhydrides thereof, with phosgene in the presence of a benzimidazole or a benzotriazole as catalyst.

5 Claims, No Drawings

PREPARATION OF ACID CHLORIDES WITH PHOSGENE IN THE PRESENCE OF A CATALYST

This invention relates to an improved process for the preparation of acid halides. In particular, this invention relates to an improved process for the preparation of acid chlorides from carboxylic acids and phosgene in the presence of benzimidazoles and benzotriazoles as catalysts therefor.

Acid halides and particularly monocarboxylic acid chlorides comprise an important class of chemical intermediates. Their commercial importance justifies a continuing interest in the development of new and improved processes for their preparation on a large scale.

Carboxylic acids and in most instances, anhydrides thereof, it is known, can be converted to carboxylic acid chlorides by reaction with thionyl chloride, phosphorus pentachloride or more economically, phosgene, according to the general equation $$R\,CO_2H + \begin{cases} COCl_2 \\ SOCl_2 \\ PCl_5 \end{cases} \rightarrow R\,COCl + \begin{cases} CO_2 + HCL \\ SO_2 \\ POCl_3 \end{cases}$$

wherein $RCO_2H$ represents an organic carboxylic acid and $R\,COCl$ represents the corresponding organic carboxylic acid chloride.

This reaction, which may be carried out in the presence of various solvents, e.g., xylene, nitrobenzene, chlorobenzene and the like, proceeds only sluggishly, or is incomplete, or is accompanied by undesired side reactions such as the formation of carboxylic anhydrides which reduces the yield of the desired acid chloride.

It has been proposed to improve the yield of acid chloride on phosgenation of carboxylic acids by the addition to the reaction mixture of catalytic materials. For this purpose it has been suggested to employ catalytic amounts of materials as heterocyclic nitrogen compounds such as pyridine, quinoline, N-phenyl pyrrolidone; tertiary amines such as trimethylamine, dimethylcyclohexylamine, dimethylaniline; amides such as dimethyl formamide, benzanilide, caprolactam and the like. In most instances, while these substances have advantageously increased the rate of reaction between the phosgene and carboxylic acid, their use has not been entirely satisfactory due in some cases to their volatility, which leads to contamination of the acid chloride product separated by fractional distillation, or, in other cases, due to their reactivity with phosgene or the carboxylic acid reactant.

It is, therefore, an object of this invention to provide an improved method for the preparation of monocarboxylic acid chlorides by reaction of phosgene with monocarboxylic acids or anhydrides thereof.

Another object is to provide novel catalysts for this synthesis wherein the acyl chloride product can be obtained not only in excellent yield but also uncontaminated by the catalyst or catalyst derived materials.

Other objects and advantages of my invention will be obvious from the following specifications.

The objects of this invention are attained in an improved process wherein a monocarboxylic acid and phosgene are caused to react in the presence of certain benzimidazoles or benzotriazoles as catalyst therefor. The product of such a reaction can be separated from the reaction mixture by fractional distillation and is obtained not only in excellent yield but also is uncontaminated by the catalyst or catalyst derived impurities.

The novel catalysts suitable for use in the process of this invention are benzimidazoles or benzotriazoles which may be unsubstituted or substituted with one or more substituents inert to the phosgene and carboxylic acid reactants.

Such compounds may be represented by the following general formulae:

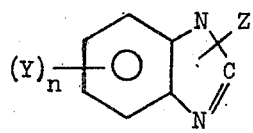 ; 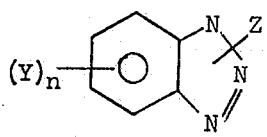 and 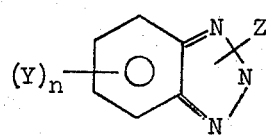

wherein Y and Z are members selected from the group consisting of hydrogen, lower alkyl containing 1 to 6 carbon atoms such as methyl, ethyl, tert-butyl, etc.; halogen such as chloro, bromo, fluoro, iodo; alkoxy containing 1 to 6 carbon atoms such as methoxy, ethoxy, butoxy, etc.; alkaryl such as tolyl, xylyl, and aryl radicals such as phenyl, biphenyl, naphthyl, etc. and aralkyl such as benzyl, phenethyl, etc. and n is an integer of 1 to 4, preferably 1 to 2. Additionally, the alkyl and aryl radicals may be substituted with such groups as halogen, nitro, alkoxy, etc. provided that any such substituent is itself inert and is not reactive with the phosgene and carboxylic acid reactants.

Illustrative examples of such compounds effective as catalysts in this invention include the following:
benzimidazole
2-ethylbenzimidazole
2-methylbenzimidazole
2-butylbenzimidazole
5(or 6)-tertbutylbenzimidazole
2-isopropyl-5(or 6)-methylbenzimidazole
1-p-chlorobenzyl-6-nitrobenzimidazole
2-o-bromophenyl-5(or 6)-nitrobenzimidazole
5(or 6)-chloro-2-trifluoromethylbenzimidazole
4,6(or 5,7)-dichlorobenzimidazole
1,5-dimethylbenzimidazole
5,6-diethylbenzimidazole
1-ethyl-5-methoxybenzimidazole
5(or 6)-butoxybenzimidazole
5(or 6)-phenylbenzimidazole
2-p(or o-, or m)tolylbenzimidazole
1H-(or 2H-)benzotriazole
5-chloro-1H-benzotriazole
4-bromo-2H-benzotriazole
5,6-difluoro-1H-benzotriazole
5,6-diethoxy-2H-benzotriazole
4-methyl-1H-benzotriazole
5-nitro-2H-benzotriazole
4,5,7-tribromo-6-chlorobenzotriazole
5-trifluoromethylbenzotriazole
5-chloro-1-p-chlorophenylbenzotriazole
1-(m-chlorophenyl)-5-nitrobenzotriazole
6-chloro-1-m(and o- and p-)tolylbenzotriazole
1-methylbenzotriazole 5-nitrobenzotriazole
2-(o-chlorophenyl)benzotriazole
4-(and 5-)nitro-2-phenylbenzotriazole Mixtures of these and equivalent substances can be used also. Benzimidazole, benzotriazole and methyl derivatives thereof are the preferred catalysts.

These catalysts are advantageously employed in the preparation of monocarboxylic acid chlorides by phosgenation of monocarboxylic organic acids, particularly those of the aliphatic, cycloaliphatic class which may be saturated or unsaturated as well as aromatic acids. As typical of the acyl chlorides and the corresponding monocarboxylic acid starting materials the following are mentioned.

Acetyl chloride from acetic acid or anhydride
Butyric chloride from butyric acid or anhydride
Trichloroacetyl chloride from trichloroacetic acid
Valeryl chloride from valeric acid
Lauroyl chloride from lauric acid
Palmitoyl chloride from palmitic acid
Stearoyl chloride from stearic acid
Oleoyl chloride from oleic acid
Cyclohexylcarbonyl chloride from cyclohexane carboxylic acid
Benzoyl chloride from benzoic acid
p-nitrobenzoyl chloride from p-nitrobenzoic acid Mixtures of monocarboxylic acids, e.g., soya fatty acids, can be converted by reaction thereof with phosgene to form mixtures of the corresponding acyl chlorides.

A variety of organic solvents, inert to the phosgene and acid reactants, can optionally be employed as diluents in the practice of the instant process such as saturated aliphatic hydrocarbons, aromatic hydrocarbons, halogen substituted hydrocarbons and the like as is well known in the art.

The temperature and pressure ranges employed in the instant process are not critical. The process is generally conducted at atmospheric pressure although subatmospheric and superatmospheric pressures may be employed, if desired. The temperature range may vary from about 50°C. to the boiling point of the reaction mass with the preferred range being from about 100° to 180°C. at atmospheric pressure.

The benzimidazole or benzotriazole catalysts are employed in conventional catalytic amounts. In general, a catalyst concentration, based on the weight of the acid, of from about 0.1 to about 10 percent, and more preferably 0.5 to 5 percent, is employed. Catalyst concentrations above or below the aforementioned ranges may be employed but are less preferred.

In accordance with a preferred embodiment of the present invention, the monocarboxylic acid, dissolved, if desired, in a solvent which is inert to phosgene and the acid, is warmed to about 60° to 150°C., to provide a solution or slurry, or to melt the acid to which the catalyst is added, conveniently in an amount within the range of from about 0.5 to 5.0% by weight of the monocarboxylic acid. Thereafter gaseous phosgene is bubbled into the mass which is maintained at a reaction temperature between about 100°C. and 180°C. Flow of the phosgene is continued until the desired proportion of the monocarboxylic acid has been converted to the corresponding acyl chloride. Generally, and especially in batch procedures, complete conversion is desired, and hence at least an equimolecular proportion of phosgene is added. Preferably, in such instances, a slight excess is added. The course of the reaction can be followed by the evolution of gaseous hydrochloric acid and it is recommended practice to continue the heating phase of the process for a short period after the evolution of this by-product has substantially ceased. Thereafter, the mass is blown with dry air to remove residue phosgene and hydrogen chloride and the solvent, if present, is removed by distillation, preferably under reduced pressure. The crude mass thus freed of solvent, is then fractionally distilled to separate a product fraction which is essentially free from contamination by the catalyst or catalyst-derived products.

The process can be operated in a batch manner or can be made to operate continuously by feeding monocarboxylic acid-solvent-catalyst mixture to a reaction zone wherein a separate stream of phosgene is caused to mix with, in either a co-current or counter-current manner, and react with the monocarboxylic acid while simultaneously continuously withdrawing an equivalent portion of the reaction mixture from the said reaction zone. The reaction mixture can then be treated in a known manner, to separate solvent, unchanged monocarboxylic acid, if any, product acyl chloride and catalyst residue.

The process of the present invention will be illustrated by the following examples which include the best mode presently known to me for carrying out the improvements devised by me. In these examples, parts and percentages are by weight and temperatures are given in degrees centigrade.

EXAMPLE 1

A mixture of 100.1 parts of benzoic acid and 2 parts 2-methylbenzimidazole was heated to about 140°. A stream of phosgene was passed into the molten mass at the approximate rate of 50 parts/hour. After ½ hour the mass was heated to 160° as the phosgene addition was continued at the same rate and then, as the mass was heated to 170°, the rate of phosgene addition was increased to 100 parts/hour. The reaction was continued until approximately 348 parts of phosgene had been added. Thereafter, the mixture was heated to and maintained at 193° for ½ hour. The mass (weight 117 parts) was degassed at 125°/95 mm for ½ hour (weight of degassed mass 116.9 parts). The mass was distilled to recover 110.8 parts of benzoyl chloride representing a yield of 95.9% of the theoretical yield. The product had a purity of 99.9+%.

EXAMPLE 2

A mixture of 110 parts of lauric acid and 2 parts of a mixture of 4(7)- and 5(6)-methylbenzimidazoles, was heated to between 170° and 180° and phosgene passed into the molten mass at the rate of 100 parts/hour for 1-½ hours. The mixture was distilled at 138° to 140°/12 mm collecting the product, lauroyl chloride in the yield of 101 parts (84% yield). The product was of a purity in excess of 99%.

EXAMPLE 3

The procedure of Example 2 was repeated with the exceptions that an equivalent proportion of 2-methyl-1H-benzotriazole was used instead of the mixed methylbenzimidazoles to catalyze the reaction and the reaction period was 1 hour 40 minutes instead of 1-½ hours.

The product, lauroyl chloride, distilled at 140° to 142°/13 mm and was obtained in a yield of 75 parts (62%) and was of excellent purity.

I claim:

1. A process for the preparation of a monocarboxylic acid chloride which comprises reacting a monocarboxylic acid or anhydride thereof with at least an equimolecular proportion of phosgene at a temperature between about 100° to about 180°C. in the presence of about 0.5 to 5 percent, by weight of the carboxylic acid or anhydride, of a catalyst selected from the group consisting of, methylbenzimidazole, and methylbenzotriazole.

2. In a process for the preparation of a monocarboxylic acid chloride by reaction of phosgene with a monocarboxylic acid or anhydride the improvement which comprises reacting said phosgene and monocarboxylic acid or anhydride in the presence of a catalytic amount of methyl benzotriazole.

3. In a process for the preparation of a monocarboxylic acid chloride by reaction of phosgene with a monocarboxylic acid or anhydride, the improvement which comprises reacting said phosgene and monocarboxylic acid or anhydride in the presence of a catalytic amount of methyl benzimidazole.

4. A process as claimed in claim 2 wherein said carboxylic acid is lauric acid.

5. A process as claimed in claim 3 wherein said carboxylic acid is benzoic acid.

* * * * *